US012561480B1

(12) United States Patent
Singh et al.

(10) Patent No.: US 12,561,480 B1
(45) Date of Patent: Feb. 24, 2026

(54) DATA PRIVACY COMPLIANCE FOR SECONDARY DATA STORAGE SYSTEMS

(71) Applicant: Amazon Technologies, Inc., Seattle, WA (US)

(72) Inventors: Bijendra Singh, Cedar Park, TX (US); Shashikanth Rao Palsikar, Leander, TX (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 18/525,718

(22) Filed: Nov. 30, 2023

(51) Int. Cl.
*G06F 21/00* (2013.01)
*G06F 21/62* (2013.01)

(52) U.S. Cl.
CPC .................................. *G06F 21/6254* (2013.01)

(58) Field of Classification Search
CPC ................................................... G06F 21/6254
See application file for complete search history.

(56) References Cited

U.S. PATENT DOCUMENTS

2014/0317756 A1* 10/2014 Takahashi ........... G06F 21/6254
726/26
2019/0332807 A1* 10/2019 LaFever .............. H04L 63/0407

2020/0320224 A1* 10/2020 Regensburger ......... G06F 17/18
2023/0274026 A1* 8/2023 Chalk ................... G06F 21/577
726/27
2023/0401336 A1* 12/2023 LaFever .............. G06F 21/6245

OTHER PUBLICATIONS

Devi et al., "Enhancing privacy for automatically detected quasi identifier using data anonymization", IOS Press, https://journals.sagepub.com/doi/full/10.3233/WEB-221823, First published online Mar. 22, 2023.*
Johnson et al., "Chorus: a Programming Framework for Building Scalable Differential Privacy Mechanisms," 2020 IEEE European Symposium on Security and Privacy (EuroS&P), Genoa, Italy, pp. 535-551 (Year: 2020).*

* cited by examiner

*Primary Examiner* — Morshed Mehedi
(74) *Attorney, Agent, or Firm* — Davis Wright Tremaine LLP

(57) ABSTRACT

Systems and methods are described relating to enforcing privacy constraints when data is transferred between data systems. In some examples, a request to transfer a dataset from a primary data system to a secondary data system may be obtained. A set of privacy policies May be enforced on the dataset to generate a modified dataset by performing one or more of: modifying values of quasi-identifiers (values that do not individually, uniquely identify a user) identified in the dataset such that the dataset satisfies one or more of an anonymity or a diversity test; or introducing inert data into the dataset to meet a differential privacy criteria, where the amount of inert data is generated based at least in part on the one or more quasi-identifiers in the dataset. The service may then cause the modified dataset to be accessible by the secondary data system.

20 Claims, 8 Drawing Sheets

400

Assign anonymization technique
to each quasi-identifier
— 402

Generate list of quasi-identifier(s)
with anonymization mechanism
— 404

Select quasi-identifier from list
— 406

Perform anonymization
technique associated
with quasi-identifier
410

←No— Does quasi-identifier
pass K-anonymity test?
— 408

Yes

—no— Does quasi-identifier
pass L-diversity test?
— 412

Yes

End
— 418

—no— More
quasi-identifiers in
list?
— 414

Yes

Select new quasi-identifier from
list
— 416

FIG. 4

DATA PRIVACY COMPLIANCE FOR SECONDARY DATA STORAGE SYSTEMS

BACKGROUND

There are broadly two classes of systems from data privacy perspective: a first type of system where new data is generated either through direct interactions with users or data is inserted into the system through a system-to-system interface or via an interactive data ingestion interface. These systems may be a collection of one or more live services or subsystems capable of supporting one or more data ingestion interfaces. These systems may be referred to as primary data systems. The second type of data system includes downstream systems which receive data from other upstream systems. These systems can be data warehousing or other business intelligence related systems which perform secondary post processing of data and offer business intelligence reports and dashboards. These systems may be referred to as secondary data systems.

Data privacy is normally well enforced at the primary data source system level. However, once the data is vended out to secondary data storage for data warehousing, there is typically no effective mechanism to enforce data privacy consistently. In many cases, the vended data still contains the same data, including private data, as the original data, where even larger number of users and systems have access to it for longer durations of time (e.g., years) in these secondary systems so the data privacy is at least as or even more important to enforce and maintain here. When data is vended out to the secondary systems, it is only the data, that is vended out, while all the data privacy enforcement mechanisms are typically left behind.

BRIEF DESCRIPTION OF THE DRAWINGS

Various techniques will be described with reference to the drawings, in which:

FIG. 4 illustrates another example process for generating privacy compliant datasets, which may be performed by a data privacy module or service, according to at least one embodiment;

DETAILED DESCRIPTION

Figure 1:
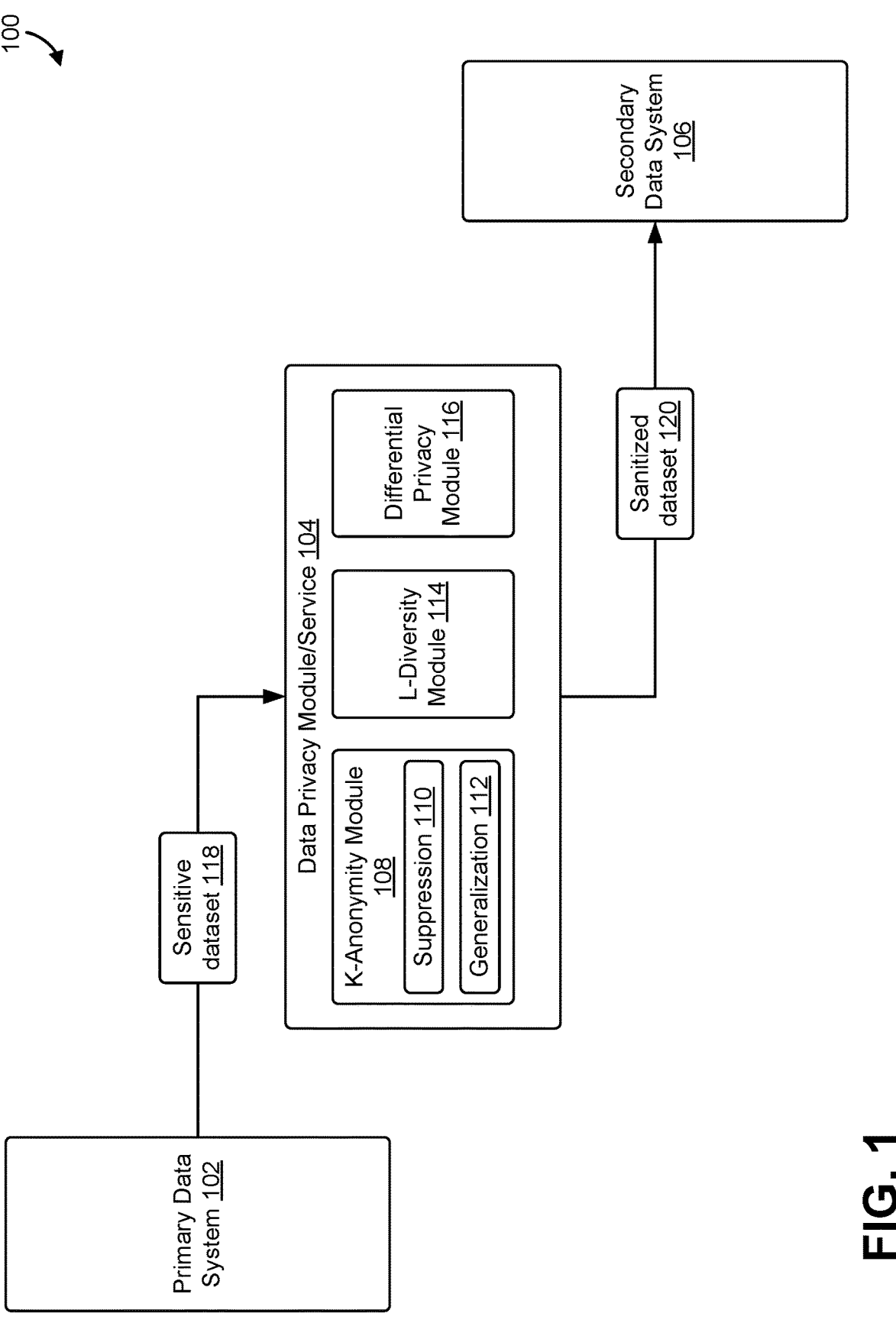
FIG. 1 illustrates an example of a data privacy service that enforces privacy requirements on data transferred from a primary data system to secondary data systems, according to at least one embodiment.

Systems and methods are described herein for enforcing data privacy constraints when data is transferred from primary data systems to secondary data systems. The described techniques may be utilized to transfer privacy data (e.g., data that contains sensitive or private information) between a primary data system, such as a system where privacy data is created including retail websites or system, health information systems, etc., to a secondary system that stores or uses the data in a number of ways that is either trusted, or untrusted, such as data warehousing services, data analytics, etc. In the case of a transfer of data to a trusted secondary system, various processes and standards may be set by a data privacy service for the secondary system to at least in part enforce when ingesting, storing, and further vending the privacy data. In the case of a transfer of data to an untrusted secondary system, various processes and standards may set and enforced or enacted on the privacy data, by a service or process, before the privacy data is vended to the secondary system.

In various examples, a data privacy service may implement a process for enforcing a set of privacy constraints on a dataset by first identifying if a given dataset has any sensitive information, such as health related information, financial instrument information, etc. Next, the dataset may be analyzed to determine if it contains any (personal) identifiers that could identify an individual or entity. A personal identifier, as used herein, generally refers to data that directly identifies a person (or entity) individually without any additional information (e.g., PersonId). If any such identifiers are detected then those identifiers may be scrubbed or removed from the data set.

Next, the data may be analyzed to determine if it contains any quasi-identifiers. A quasi-identifier may be data that can be combined with other data points to help identify an individual or entity (e.g., age, zip code, etc.). A list may be created of the quasi-identifiers, where a type of data anonymization or modification (e.g., data-suppression or data-generalization) may be assigned to each of the different types of quasi-identifiers in the list that is to be applied to the quasi-identifiers to generate a privacy compliant dataset. For each quasi-identifier in the list, the data privacy service may apply a anonymity test or criteria to determine if there are enough individuals or entities with the same quasi-identifier value to reasonably prevent identification of an individual just based on the quasi-identifier value. If the data fails the test, then the specified data anonymization technique may be applied to the values for the quasi-identifier in the dataset, until the test/criteria is satisfied. In some cases, this may be performed per quasi-identifier, such that multiple rounds of data suppression or data generalization may be performed until the anonymity test is met. In other cases, one round of data suppression or data generalization may be applied to some or each quasi-identifier, in succession, until the k-anonymity test/criteria is satisfied.

The data privacy service may then apply a diversity test or criteria to the dataset, to ensure that sensitive data fields in the dataset have well represented different values within equivalence classes (where an equivalence class is set of records that have the same values for some quasi identifier). In some cases, an equivalence class may be formed using current quasi-identifier(s) from the compiled list of quasi-identifiers in the dataset. In some examples, a diversity test may be applied by computing types of sensitive data for an equivalence class. If the diversity tests fails (when the types of sensitive data in an equivalence class are less than predetermined value), further data-generalization/suppression may be performed for eligible quasi-identifiers (the quasi-identifier may have already gone through the process during the anonymity test phase).

The data set may then be compared to a differential privacy threshold, where a differential privacy threshold specifies how diverse the values in the dataset need to be for different entries. Based on the degree or threshold of differential privacy attributes to the dataset, additional rows or entries of inert data, may be introduced into the dataset, where the inert data is generated based at least in part on the quasi-identifiers in the dataset. In various aspects, this may include duplicating quasi-identifier columns of the data such that the data varies by the specified degree of differential privacy. For example, if a differential privacy degree of 10 is selected (which implies 10%) then noise data may be added to the dataset that varies up and down by 10%. By utilizing one or more of the above criteria, anonymity, diversity, and differential privacy, and applying them in an iterative way, a data privacy service may increase data security of transferring datasets containing sensitive information to secondary systems that may utilize the data, both for trusted an untrusted systems.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) increased data security for data transferred between trusted and untrusted data systems; (2) more efficient utilization of computing resources in enforcing data privacy on data transferred between different computing systems and services; and (3) other benefits and advantages as will be described and made apparent in the description below.

FIG. 1 illustrates an example 100 of a data privacy service or module 104 that may enforce privacy constraints or criteria on data 118, 120 being transferred from a primary data organization system 102 to a secondary data system 106. As illustrated, a primary data organization system 102 may include any computerized that generates, ingests, modifies, etc., data that may contain sensitive information linked to a particular individual or entity. These systems 102 may include health related systems, retail systems or services, financial services, etc. The secondary data system 106 may include various data analytic of storage services, such as relational database services, and others that may use the data for various purposes, such as to generate analytic information of health information, marketing research, buying information, and so on. In various cases, the data privacy service 104 may enable the safe transfer of various datasets that may contain sensitive data, such as sensitive dataset 118, by removing various identifiers from the data, masking quasi-identifiers in the data, and/or adding inert data to ensure a certain configurable level of differential privacy in the data, to produce sanitized dataset 120 that can be transferred or vended to a secondary data system 106, regardless of whether the secondary system can be trusted to maintain appropriate levels of security around the data.

In some cases, the data privacy service 104 may enforce or apply different privacy constraints or criteria to sensitive dataset 118, such as via a K-anonymity module 108, an L-diversity module 114, and/or a differential privacy module 116. In some cases, the data privacy service 104 may perform these different tests on the sensitive dataset 118 and modify the data if it does not meet one or more of the particular criteria or tests. This implementation may be particularly useful when 1) trustworthiness of the secondary data system 106 is unknown, or 2) the secondary data system 106 is untrusted. In other examples, such as when the secondary data system 106 is trusted, then the data privacy service 104 may enforce or apply one or more tests on the data to ensure privacy compliance in conjunction with the secondary data system 106, such as will be described in greater detail below.

In various cases, the data privacy service or module 104 may include three main components or processes: a K-anonymity module 108, an L-diversity module 114, and/or a differential privacy module 116. From a high level, the data privacy service 104 may first determine that a dataset contains sensitive data, such that privacy constraints should be enforced on the data before vending the data to a secondary system 106. If the dataset is determined to include sensitive data (which can be configured to include a variety of information, including financial information, personal identification, health information, etc.), the data privacy service 104 may first remove an indifferent or fields within the data that can uniquely identify an individual or entity (e.g., full name, social security number, etc.). The data privacy service 104 may then determine/identify quasi-identifiers within the dataset, such that may not individual identify an individual or entity, but when combined with other information, can uniquely identify an individual or entity. The K-anonymity module 108 of the data privacy service 104 may then apply a data anonymity or modification process, such as suppression (changing the value of the quasi identifier to suppress the data, such as with "XXX") or generalization (where the data is converted to a more generalized form, such as eliminating the last few digits of a zip code), or other type of data modification to a selected quasi-identifier. It should be appreciated that other forms of data modifications may be used to a similar effect. The K-anonymity module 108 may perform one or both (or more) of the anonymity processes to one or multiple quasi-identifiers until the dataset passes a K-anonymity test, where K can be configurable or set by default. In various cases the K-anonymity test may ensure that the quasi-identifier for a given entry in the dataset is equivalent to at least $K-1$ other entries in the dataset.

In various cases, the data privacy service 104 may also implement an L-diversity module 114, which may apply additional suppression or generalization to the modified dataset post K-anonymity processing, so that the dataset meets an L-diversity test or criteria. The L-diversity test or criteria may specify that there are at least L well represented different values for the sensitive attribute/data field within each equivalence class (e.g., where an equivalence class is a set of records or entries that have the same values for at least some of quasi-identifier).

In various examples, the data privacy service 104 may also implement a differential privacy module 116. The differential privacy module 116 may compare the dataset, as modified by the K-anonymity module 108 and/or the L-diversity module 114 to a configurable differential privacy threshold (e.g., out of 100) that indicates what percent of the dataset is inert data. The differential privacy module 116 may then generate and insert inert data to satisfy the threshold amount using the quasi-identifiers already identified in the dataset, such that may not adversely or significantly affect statistical analysis of the data. The output of these processes may then be a sanitized dataset 120, which may be vended or transferred to one or more secondary data systems 106. The sanitized dataset 120 may comply or meet the various data privacy thresholds imposed by the data privacy service 104 such that various data in the dataset may not be correlated to individuals or entities.

Figure 2:
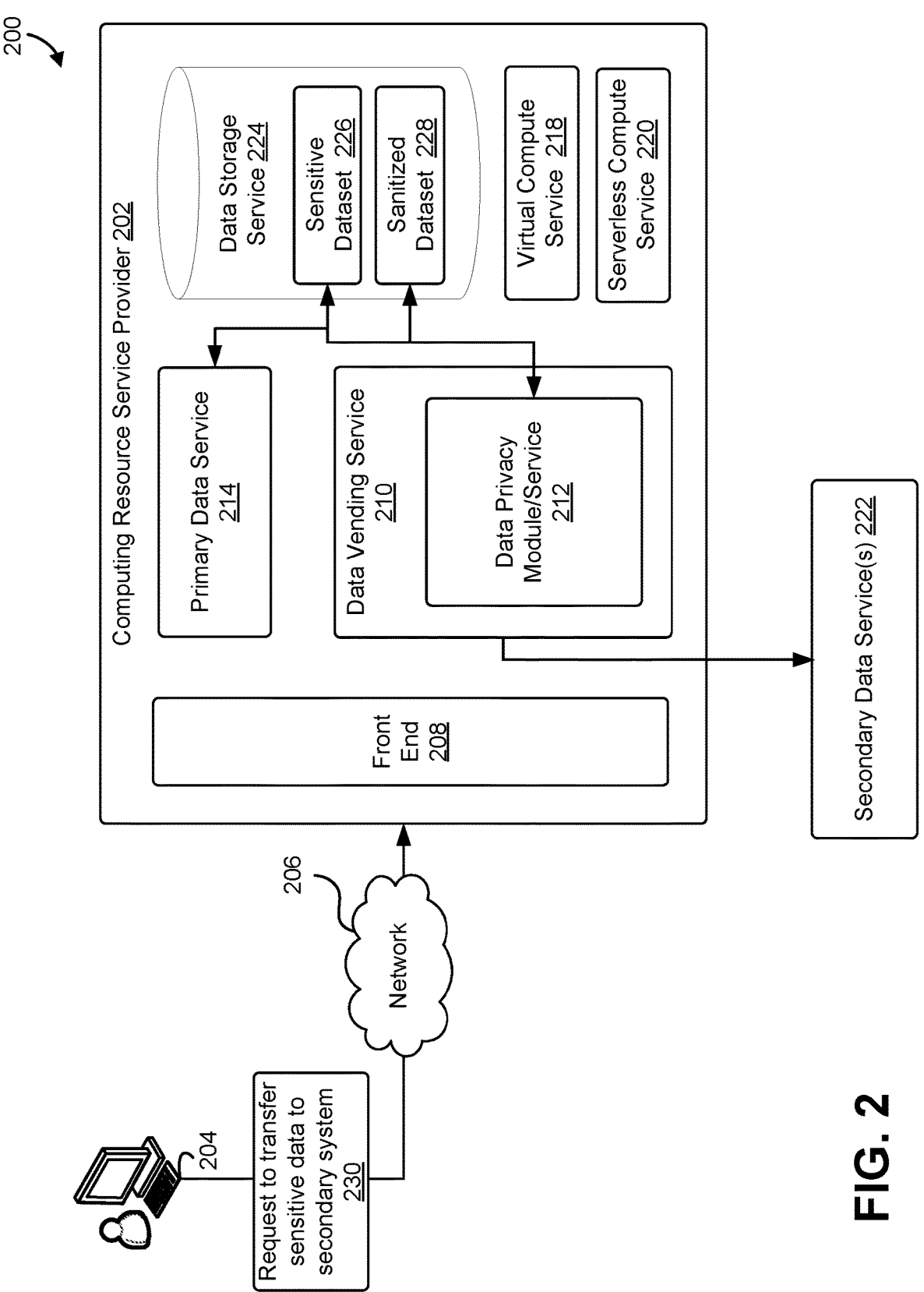
FIG. 2 illustrates an example environment in which the described techniques can be practiced, according to at least one embodiment.

FIG. 2 illustrates an example environment 200 in which a data privacy service or module 210 may be implemented by a data vending service 210 provided by a computing resource service provider 202. In various cases, the data vending service 210 may be responsible for transferring datasets, such as sensitive datasets 226 or sanitized datasets 228, from a primary data service 214, which in some cases, may be provided by the computing resource service provider 202, to a secondary data service 222, which may or may not be provided by the computing resource service provider 202. As illustrated, the data privacy service 212, the primary data service 214, and/or the secondary data service 222 may be examples of and/or include one or more aspects of the data privacy service 104, the primary data service 102, and/or the secondary data service 106 described above in reference to FIG. 1.

The data vending service 210 and the data privacy service 212 may interact with various other computer-implemented services, such as one or more of a front end 208, virtual compute service 218, serverless compute service 220, and/or a data storage service 224 to ensure that datasets vended secondary data systems 222 comply with one or more privacy criteria. Various client computing devices 204 may interact with the computing resource service provider 202 through one or more networks 206 to access this functionality.

Client 204 may refer to a client computer system or computing device connected to a server (e.g., computing resource service provider) over a network 206. In some cases, client 204 refers to a user or operator of a client computer system and may be an employee of an organization that utilizes a computing resource service provider 202 to interact with various forms of data, such as through one or more of a front end 208, virtual compute service 218, serverless compute service 220, and/or a data storage service 224. In some cases, computing device 204 may be associated with the computing resource service provider 202, such as may be provided by or through a data vending service or other computerized service 210. In these cases, the computing device 204 may be operated by a human operator or user.

In some cases, the front end 208 may receive a request to transfer or move sensitive data at 230 and direct it to the appropriate service. The front end 208 may be a system including a set of web servers (e.g., a single web server or a set of web servers which may be managed by a load balancer) provided by the computing resource service provider 202. Web servers of the front end 208 may be configured to receive various requests and data and to process them according to one or more policies associated with the service. In some examples, device 204 may use client software that is configured to establish a client-server relationship with a service of a computing resource service provider 202. A client 204 may connect to a service via front end 208, which receives requests from clients and routes them to backend services. Front end 208 may interface with one or more of a data vending service 210, data privacy service 212, virtual compute service 218, serverless compute service 220, and/or a data storage service 224 and/or other services offered by a computing resource service provider 202 to its customers. In at least one embodiment, client 204 interacts with a GUI to interact with various data provided by or through the computing resource service provider 202, and client-side software translates the GUI setup to a web service API request which is transmitted from the client computer system 204 to front end 208 via a network 206. In an embodiment, the network 206 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 206 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. A computing resource service provider 202 described herein may be implemented using techniques described below in reference to FIG. 8. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 202 may provide data storage through a data storage service 224 to store and manage large volumes of data, including text, image, and other data. The data storage service 224 may store various data, such as may be organized into various datasets 226, 228 corresponding to accounts or profiles. In some aspects, the data storage service 224 may store various data used and/or modified by the data vending service 210 to effectuate implementing privacy controls on data passed to secondary data services 222 which may not be trusted to enforce privacy controls on various datasets that may contain sensitive data, such as sensitive datasets 226. Sensitive datasets 226 may include various forms of data, such as may be in tabular or relational data structures (e.g., organized into columns and rows). Sensitive datasets 226 may be generated by or ingested by various systems and services provided by the computing resource service provider 202, such as primary data service 214. Sensitive datasets 226 may include datasets that include sensitive data, such as any type of data that a user or entity would desire to keep private. In some cases, the sensitive data of a sensitive dataset 226 may be positively identified prior to the data being stored by the data storage service, such as based on the data itself, an origin of the data, a type of service that generated the data (e.g., healthcare data service), and so on. In yet some cases, the sensitive dataset 226 may be a set of data that may include sensitive information, but which has not been actively classified as actually containing sensitive data.

Data storage service 224 may be an on-demand data storage service, such as an object-based data storage service that services API requests to store and retrieve data objects synchronously, and may be configured to store various forms of data and media, and other data structures generated and updated by the primary data service 214 and the data vending service 210/data privacy service 212. The data storage service 224 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 224, may be organized into data objects, in one or more logical data containers. The data storage service 224 may include one or more data objects, which may have arbitrary sizes and may, in some instances, have constraints on size. Thus, the data storage service 224 may store numerous data objects of varying sizes. The data storage service 224 may operate as a key value store that associates data objects with identifiers of the data objects which may be used by the data vending service 210 to retrieve or perform other operations in connection with the data objects stored by the data storage service 224. Access to the object-based data storage service 224 may be through application programming interface (API) calls to the service or via an interface, such as a graphical user interface (GUI). Access to the data storage service 224 may be through application programming interface (API) calls to the service, for example from client device 204 directly or through the computing resource service provider 202 and/or front end 208.

It should be appreciated that the data storage service 224 may additionally or alternatively provide non-object based data storage, such as block data storage, table-oriented data storage, relational databases, file-based storage, and the like. The data storage service 224 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 202 may provide a primary data service or services 214. Primary data service or services 214 may be a collection of computing resources, including physical resources, virtual resources, or combinations thereof, configured to obtain, modify, and/or store customer data, such as may be stored as sensitive datasets 226. In various examples, the primary data service 214 may include various types of data management systems, data ingestion systems, data compiling systems, customer relational management systems (CRMs), online retail systems, and various other systems that may interact with customer data which may contain sensitive information.

In various examples, the computing resource service provider 202 may interact with one or more secondary data services 222, which may be a collection of computing resources, including physical resources, virtual resources, or combinations thereof, that utilize various datasets for a variety of purposes, such as generating analytics for the data, storing the data, and for various other purposes. In some cases, the secondary data service(s) may be provided by the computing resource provider 202, or may be provided by external systems and services. In either example, in some cases, the trustworthiness of the secondary data service may be unknown. In these cases, a data vending service 210 may be implemented to ensure that various privacy controls are put in place to ensure data privacy and data security is maintained when transferring the data to these secondary services 222. In the case that the secondary data service 222 is trustworthy, the same privacy controls may be enforced on the datasets by a combination of the data vending service 210 and the secondary service 222.

In some aspects, the computing resource service provider 202 may provide a data vending service 210. The data vending service 210 may be a collection of computing resources, including physical resources, virtual resources, or combinations thereof, configured to obtain, direct, and oversee transferring data between different systems and services, such as from a primary data service 214 to one or more secondary data services 222. In various cases, the data vending service 210 may obtain a request to transfer data, such as via request 230 from user device 204. In other cases, automated rules (e.g., a change to a dataset is detected) or transfer scheduled may be established such that the data vending service initiates transfer of certain datasets according to the schedule (e.g., without receiving a directed request). In some cases, the data vending service 210 may obtain one or more datasets, such as datasets 226, 228 from a data storage service 224, for transferring to a secondary data service. The data vending service may implement a data privacy module or service 212. The data privacy module or service 212 may be a collection of computing resources, including physical resources, virtual resources, or combinations thereof, configured to compare datasets 226 with various privacy criteria, and modify the datasets 226 as needed to generate privacy compliant datasets of sanitized datasets 228, as will be described in greater detail below.

In some cases, the computing resource service provide may provide one or more of a virtual compute service 218 and a serverless compute service 220. The virtual compute service 218 may be a collection of computing resources, including physical resources, virtual resources, or combinations thereof, that provide virtual computing systems or virtual machines (VMs) that include operating systems, processors and memory to execute computing environment and various tasks. The serverless compute service 220 may be a collection of computing resources, including physical resources, virtual resources, or combinations thereof, that provide execution environments for various functions. A serverless compute service may be serverless in the sense that computing resources are dynamically allocated to perform functions (also referred to as serverless compute functions, serverless functions, Lambda functions) triggered by the events such as invocation of an endpoint from a client (e.g., a web API call via a network such as the Internet). In an embodiment, a serverless compute function is triggered when a serverless compute endpoint is invoked and computing resources in which the function can run are provisioned in response to the trigger being detected. Note, however, that embodiments of the present disclosure need not be limited to use with serverless compute services, but may also be implemented on some other virtual computing service platform, such as a software container service or virtual computer system service. As illustrates one or both of the virtual compute service 218 or the serverless compute service 220 may be used to implement enforcing data privacy functions by the data privacy service or module 212, and/or data vending functions by the data vending service 210.

Via the techniques described herein, a data privacy module or service 212, which may be a collection of computing resources, may ingest, analyze, and/or modify sensitive datasets 226, such as upon receiving a request 230 to transfer the sensitive dataset 226 to a secondary data service 222, to generate a sanitized dataset 228. In some cases, the sanitized dataset 228 may be a modified version of a sensitive dataset 226, such that the sanitized dataset satisfies one or a number of different privacy criteria, as will be described in greater detail below. The data vending service 210 may then effectuate transfer of the one or more sanitized data sets 228 to the secondary data service, such as via one or more networks 206.

Figure 3:
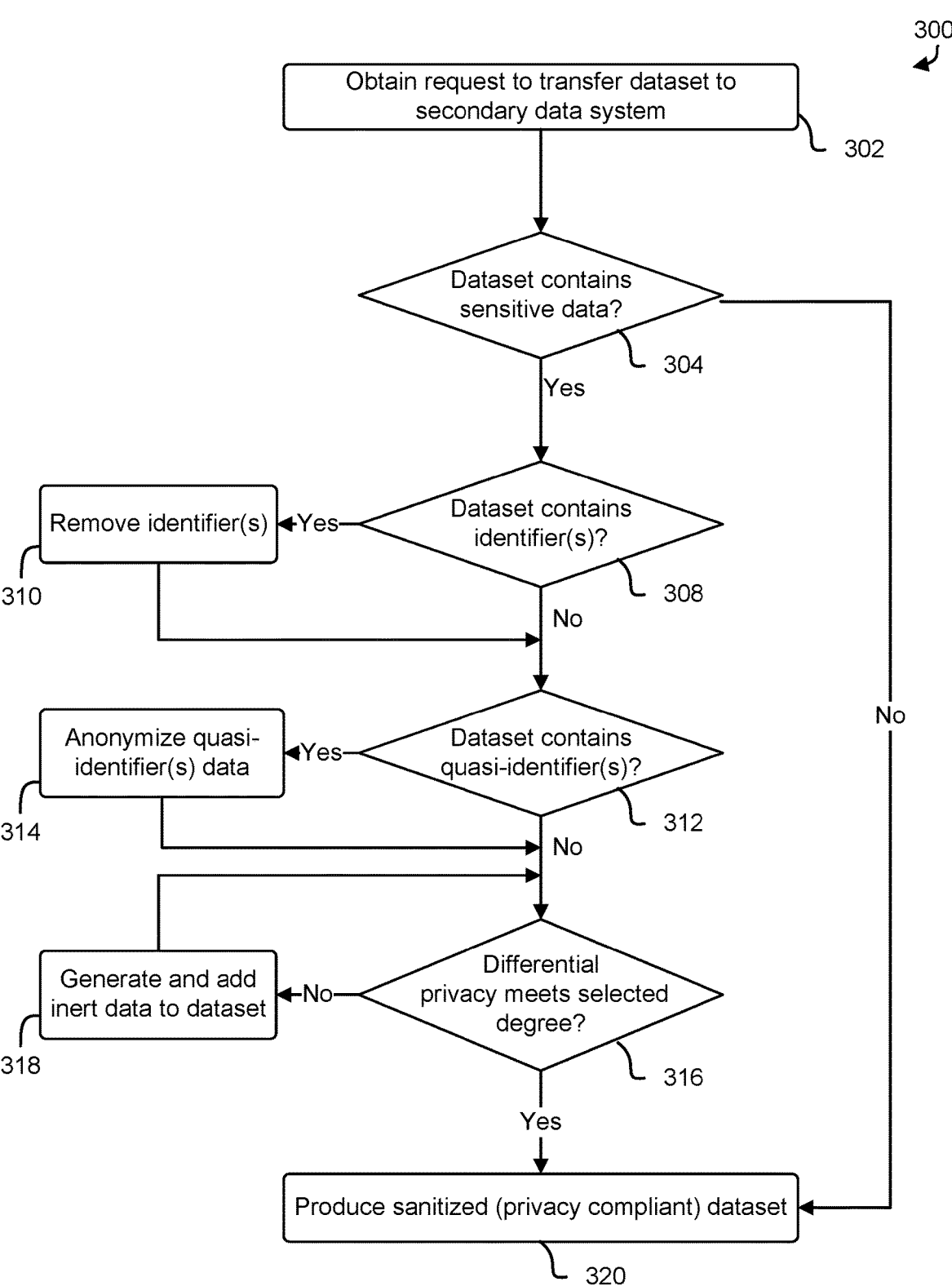
FIG. 3 illustrates an example process for generating privacy compliant datasets, which may be performed by a data privacy module or service, according to at least one embodiment.

FIG. 3 illustrates an example process 300 for generating privacy compliant datasets, which may be performed by a data privacy module or service, such as the data privacy service 104 or 210 described above in reference to FIGS. 1 and 2.

Process 300 may begin at operation 302 where a data vending service/data privacy service, such as any of services 104, 210, 212 described above, may obtain a request to transfer a dataset to a secondary data system. In some cases, operation 302 may include determining, based on one or more rules, automated schedules, a change to a dataset being detected, and/or based on other defined triggering events, to transfer a dataset from a primary data system to a secondary data system. For illustrative purposes, process 300 may be described in terms of a small sample dataset, provided below in table 1. It should be appreciated that the described techniques may be applied to datasets of various sizes, including any number of data fields and entries (e.g., columns and rows), and containing a variety of value and value types, formatted in various ways etc.

TABLE 1

|   | A | B | C | D | E |
|---|---|---|---|---|---|
| 1 | PersonId | Age | Zip Code | Commute Distance | Disease |
| 2 | 1000000 | 45 | 96121 | 20 | Heart |
| 3 | 2000000 | 72 | 65112 | 30 | Lung |
| 4 | 3000000 | 32 | 76055 | 12 | Back |
| 5 | 4000000 | 59 | 21019 | 50 | Leg |
| 6 | 5000000 | 66 | 15771 | 2 | Cancer |
| 7 | 6000000 | 25 | 99211 | 39 | Heart |

The data privacy service may then determine if the dataset contains any sensitive data, at operation 304. In some cases, operation 304 may include comparing labels for columns of the dataset to known sensitive attributes or fields, location already identified fields in the dataset that are determined to include sensitive data, and so on. It should be appreciated that various ways and techniques to determine if a dataset contains sensitive information may be implemented at operation 304. In the above example, the sensitive data may be determined as the disease information. If there is determined to be sensitive data in the dataset, then process 300 may proceed to operation 308, otherwise if no sensitive data is detected, the dataset may be output at operation 320 as a data compliant dataset. In some alternative aspects, the sensitive data may be masked or obfuscated, such as when that data is not important to the secondary data system/ analytics to be performed on the data.

At operation 308, the data may be analyzed to determine if it contains any identifiers, such that, in some cases, could identify a user or entity without additional information. If identifiers are found, then the identifiers may be removed, at operation 310. This may be illustrated via table 2 below.

TABLE 2

|   | A | B | C | D | E |
|---|---|---|---|---|---|
| 1 | ~~PersonId~~ | Age | Zip Code | Commute Distance | Disease |
| 2 | ~~1000000~~ | 45 | 96121 | 20 | Heart |
| 3 | ~~2000000~~ | 72 | 65112 | 30 | Lung |
| 4 | ~~3000000~~ | 32 | 76055 | 12 | Back |
| 5 | ~~4000000~~ | 59 | 21019 | 50 | Leg |
| 6 | ~~5000000~~ | 66 | 15771 | 2 | Cancer |
| 7 | ~~6000000~~ | 25 | 99211 | 39 | Heart |

Once all identifiers have been removed from the dataset, either at the conclusion of operation 310 or upon determining no identifiers exist in the data at operation 308, process 300 may proceed to operation 312, in which it may be determined if the dataset contains any quasi-identifiers (e.g., data that in combination with other data, could identify a user or entity). If quasi identifiers are found in the data, the one or more of the quasi-identifiers may be anonymized or modified, at operation 314. In some cases, this may include one or both of data suppression or generalization, or implementation of one or more other data generalization or obfuscation techniques. In some examples, operations 312 and/or 314 may be implemented in a number of different ways, such as my randomly selecting the anonymization technique for a given quasi-identifier, assigning the anonymization techniques, such as randomly or based on the data field or values themselves, based on the dataset and the correlation between different entries and different quasi-identifiers, and so on. In some aspects, operations 312 and 314 may be performed for each quasi-identifier identified in the data set. In other cases, operations 312 and 314 may be performed on a first selected quasi identifier, then the dataset may be analyzed to determine if it satisfies a anonymity and/or diversity test, and then if it doesn't another quasi-identifier may be selected, and so on. In the example dataset described above, age and zip code may be identified as quasi-identifiers.

FIG. 4 illustrates another example process 400 for generating privacy compliant datasets, which may be performed by a data privacy module or service, such as the data privacy service 104 or 210 described above in reference to FIGS. 1 and 2. In some aspects, process 400 may be a more detailed example of operations 312 and 314 of process 300. Process 400 may begin at operation 402, where an anonymization technique may be assigned to one or more, or each, quasi-identifier field identified in the data set. A list may then be generated of the quasi-identifiers and the assigned or associated anonymization technique (e.g., suppression or generalization), at operation 404. It should be appreciated that in some cases, operations 402 and 404 may be combined, such that some type of an association between an quasi-identifier field and an anonymization technique is generated, which may take the form of any of a variety of data structures, lists, tables, key-value pairs, etc. In the example data structure described above, suppression may be assigned to the quasi-identifier of zip code and generalization may be assigned to the quasi-identifier of age. The list may take the form of: quasi-identifier-list=[{zipcode, suppression}, {age, generalization}]

A quasi-identifier may then be elected from the list, at operation 406. For each quasi-identifier, it may be determined if the quasi-identifier passes a K-anonymity test, at operation 408. In some cases, an equivalence class for a given quasi-identifier may be determined and the K-anonymity test may be performed relative to the equivalence class. In various cases, the value of K may be set by default, or set relative to the size of the dataset, and whether users of the secondary data system are presumed to know or be able to identify users captured in the dataset. For a first user, it can be assumed that users of the secondary system know everyone in the given dataset (also called the crowd). The k-anonymity test in this case checks to see if using the dataset, users of the secondary system can identify an individual so their disease is revealed. From the example dataset, an equivalence class may be formed using quasi-identifiers, it produces 6 equivalence classes, one for each row because the quasi-identifiers are unique for each. So the k-anonymity is 1 for the dataset. If the users of secondary system know everyone in the crowd, each individual's disease is immediately revealed even when the main identifier has been removed. For a second use case, the individuals in the dataset (the crowd) are unknown to the users of the secondary system. In these examples, the k-anonymity of 1 may be sufficient because the quasi identifiers are only leading to individuals in a zip code which normally has a very high population which looks identical to this dataset.

Returning to process 400, if the quasi-identifier does not pass the k-anonymity test, then the assigned anonymization technique may be performed on the quasi-identifier, at operation 410. In the example dataset discussed above, zip code may be suppressed and age may be generalized. More specifically, in an example, for protecting individual's identity, part of data is suppressed to reduce identification risk, such as the last 3-digits of zip code, as illustrated in table 3 below:

TABLE 3

|   | A | B | C | D |
|---|---|---|---|---|
| 1 | Age | Zip Code | Commute Distance | Disease |
| 2 | 45 | 96*** | 20 | Heart |
| 3 | 72 | 65*** | 30 | Lung |
| 4 | 32 | 76*** | 12 | Back |
| 5 | 59 | 21*** | 50 | Leg |
| 6 | 66 | 15*** | 2 | Cancer |
| 7 | 25 | 99*** | 39 | Heart |

However, in this example, since each equivalence class still only has a single member, this is not helpful to ensure anonymity, so another possibility is to eliminate the zip code field from the dataset all together, such as in table 4:

TABLE 4

| A | B | C |
|---|---|---|
| Age | Commute Distance | Disease |
| 45 | 20 | Heart |
| 72 | 30 | Lung |
| 32 | 12 | Back |
| 59 | 50 | Leg |
| 66 | 2 | Cancer |
| 25 | 39 | Heart |

In addition, the age values may be generalized, such as illustrated blow in table 5:

TABLE 5

|   | A | B | C |
|---|---|---|---|
| 1 | Age | Commute Distance | Disease |
| 2 | 40-50 | 20 | Heart |

TABLE 5-continued

|   | A | B | C |
|---|---|---|---|
| 3 | 70-80 | 30 | Lung |
| 4 | 30-40 | 12 | Back |
| 5 | 50-60 | 50 | Leg |
| 6 | 60-70 | 2 | Cancer |
| 7 | 20-30 | 39 | Heart |

In some examples, once a quasi-identifier has been run through the k-anonymity test at operation 408, the quasi-identifier may be analyzed within the dataset to determine if it passes an L-diversity test, at operation 412. In some cases, a data set is considered L-diversity compliant if, for each group of records sharing a combination of key attributes, there are at least L "well represented" values for each confidential attribute (at least 1 "well-represented" values for the sensitive data in an equivalence class). For each quasi-identifier in quasi-identifier-list (which may already have gone through data suppression and generalization, the following operations may be performed: 1) form equivalence class using current quasi-identifier from the list; 2) perform L-diversity test by computing types of sensitive data for this equivalence class, where if L-diversity tests fails (when the types of sensitive data types in an equivalence class are less than predetermined value of L): then further data-generalization/suppression may be performed for eligible quasi-identifiers (the quasi-identifier may have already gone through the process during k-anonymity test). This may be represented by the arrow going from operation 412 upon a failure of the L-diversity test, redirecting back to operation 410, in which additional anonymization may be performed on the quasi-identifier.

In some cases, operation 410 may be performed for selected quasi-identifiers, such that operations 406, 408, 410, 412, and 414 are performed for each quasi-identifier in isolation. For example, once a given quasi-identifier, such as age is generalized at operation 408 and is determined to pass the L-diversity test, at operation 414, it may be determined if other quasi-identifiers are in the dataset, at operation 414. If not, then process 400 may end at 418, otherwise process 400 may loop back to operations 408-416 until some or all quasi-identifiers are run through the anonymity and diversity tests or criteria. In other cases, one or more of operations 406-412 may be performed contemporaneously or in parallel for multiple quasi-identifiers (e.g., such that one or more of operations 414, and/or 416 are omitted from process 400.

Returning now to process 300, once process 400 has been completed/at the completion of operations 312 and 314, process 300 may proceed to operation 316, in which it may be determined if the dataset meets a differential privacy degree or threshold. In some cases, the degree or threshold may indicate a percentage of inert data/noise being inserted into the dataset. In some cases this may be indicated in percentages of the whole dataset, such that adding one row of noise or inert data to 10 rows of data would yield approximately a 9% differential privacy noise metric. If the threshold is not met, as determined at operation 316, process 300 may proceed to operation 318, where inert data or noise may be generate and inserted into the dataset to meet the selected threshold or degree. In the above example dataset, this may include adding one row of inert data or noise (e.g., the last row), illustrated below in table 6:

TABLE 6

|  | A | B | C |
|---|---|---|---|
| 1 | Age | Commute Distance | Disease |
| 2 | 40-50 | 20 | Heart |
| 3 | 70-80 | 30 | Lung |
| 4 | 30-40 | 12 | Back |
| 5 | 50-60 | 50 | Leg |
| 6 | 60-70 | 2 | Cancer |
| 7 | 20-30 | 39 | Heart |
| 8 | 22-33 | 44 | Toothache |

Once the dataset has been determined to mee the differential privacy criteria or threshold, the privacy compliant (e.g., sanitized) dataset may be produced, such as to be vended to a secondary data system.

Figure 5:
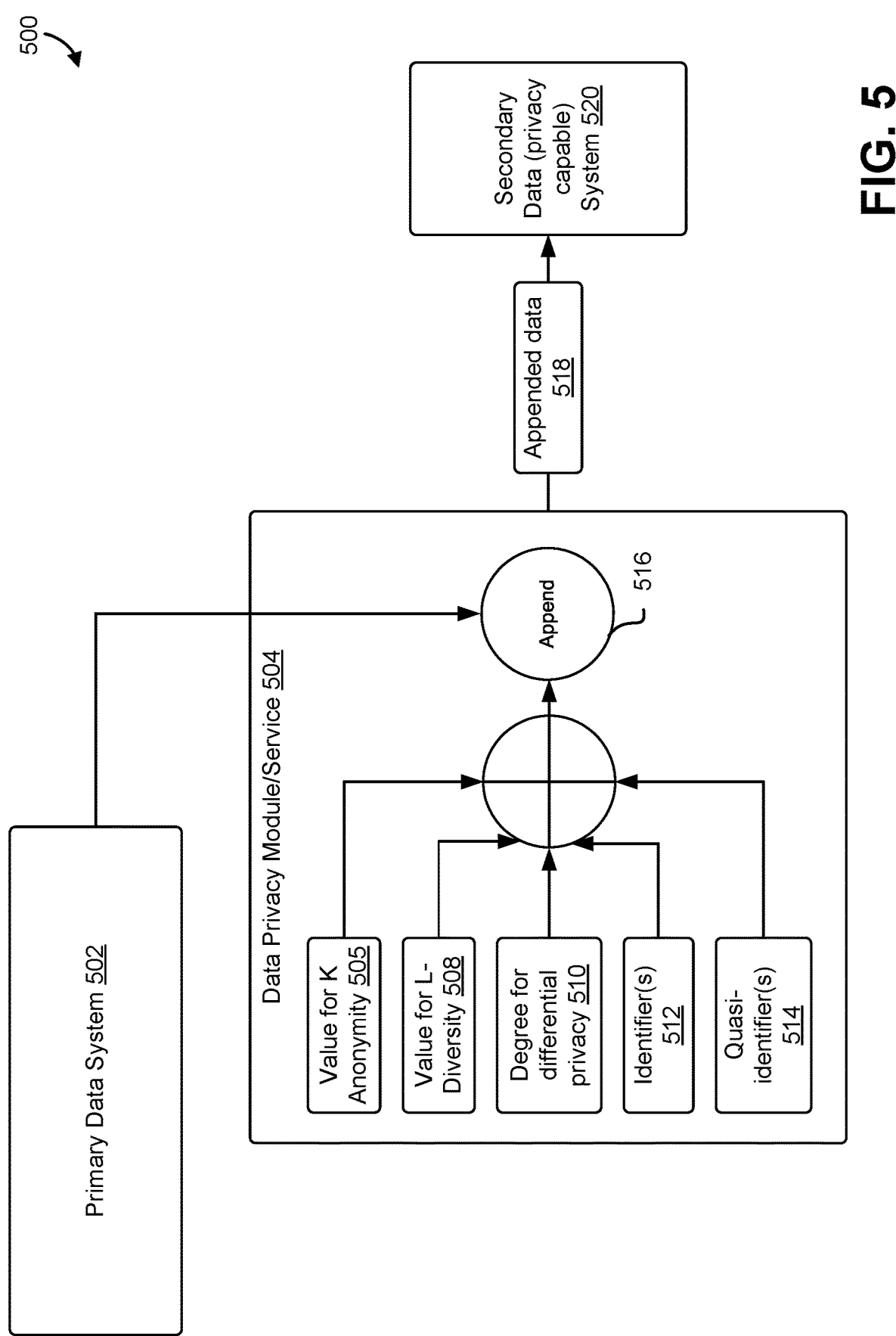
FIG. 5 illustrates another example of a data privacy module or service, according to at least one embodiment.

FIG. 5 illustrates another example 500 of a data privacy module or service 504 interacting with a primacy data system or service 502 and a secondary data system or service 520. In some examples, primary data service 502 may be an example of or include one or more aspects of primary data system or service 102, 214 described above in reference to FIGS. 1 and 2. Similarly, secondary data system or service 520 may be an example of or include one or more aspects of secondary data system or service 106, 222 described above in reference to FIGS. 1 and 2.

As illustrated in diagram 500, a secondary system 520 may be determined to be trustworthy and capable of enforcing privacy constraints on data that is vended to the secondary system 520. In some cases, this vetting process may be performed by the primary data system 502 and/or the data privacy module/service 504. In various cases, the data privacy service implementation 504 may be particularly useful when the following conditions are satisfied: 1) the downstream secondary data system can be trusted to enforce privacy policies but may require assistance in doing so; and 2) the downstream secondary system needs the data without suppression and generalization because it needs to perform reporting and/or business intelligence functionality that requires all the data. In other words, data suppression or data generalization will render the data less useful (or useless) for these systems. However, in other cases, data privacy service 504 may be beneficial implemented and used in other examples where the above 2 conditions are not satisfied.

In this implementation, the primary data system's data vending service/data privacy service 504 may not perform data suppression or data generalization, but may leave the generally data unaltered, because the secondary system 520 can be trusted to enforce privacy policies, given it is provided with enough information to do so. In this example, the data privacy service or module 504 may augment the vended data with additional metadata information, as indicated in FIG. 5 via the append operation 516. This metadata (which together with the dataset may form appended data 518) may include sufficient information to enable the downstream secondary data system 520 to enforce data privacy compliance, and may be appended, pre-pended, encoding in, or otherwise associated with the dataset at 518 (e.g., including a pointer or identifier as to where the metadata is stored, enabling the secondary data system 520 to access the metadata from a remote location). The information vended in the metadata may include the value of K for enforcing K-anonymity 505, the value of L for enforcing L-diversity 508, a degree of differential privacy 510, which determines how much of inert data or noise should be appended to anonymize the dataset. In some cases, the degree of differential privacy may be determined based on whether the accuracy of the data is more important or the security/privacy is more important. If privacy is of higher importance, than the degree of differential privacy may be set higher indicating that higher amount of noise (inert data) is to be inserted into the original dataset (e.g., where the degree of differential privacy is a numerical value indicating percentage of nose to be added).

In some cases, a list of identifiers 512 identified in the dataset may also be passed as metadata with the customer dataset. In some cases, a list of quasi-identifiers 514 identified in the dataset may also be passed as metadata with the customer dataset. One or more of these data classes may be appended, at operation 516 to the original dataset and vended, as appended data 518 to the trusted secondary data system 520. In these examples, the secondary data system 520 may use the appended metadata to enforce privacy compliance for the dataset, such as in cases where the secondary data system 520 performs one or more actions with the data beyond a trusted environment. Using the example dataset described above in reference to FIGS. 3 and 4, the dataset and appended metadata may look like the following example in table 7:

TABLE 7

|  | A | B | C | D | E | F |
|---|---|---|---|---|---|---|
| 1 | PersonId | Age | ZipCode | Commute Distance | Disease | Metadata |
| 2 | 1000000 | 45 | 96121 | 20 | Heart | {K = 3, L = 2, DP = 10, Identifiers = {Person Id}, QuasiIdentifiers = {Age, ZipCode}} |
| 3 | 2000000 | 72 | 65112 | 30 | Lung | --same- |
| 4 | 3000000 | 32 | 76055 | 12 | Back | --same- |
| 5 | 4000000 | 59 | 21019 | 50 | Leg | --same- |
| 6 | 5000000 | 66 | 15771 | 2 | Cancer | --same- |
| 7 | 6000000 | 25 | 99211 | 39 | Heart | --same- |

In some cases, the data privacy module 504 may be logically shared between the primary data system 502 and the secondary data system 520 because the privacy enforcement logic is the same. The sharing may be achieved either by using the common logic into two systems for privacy enforcement or implementing the data privacy module 504 as its own service, and then using it for both primary and the secondary data systems.

Figure 6:
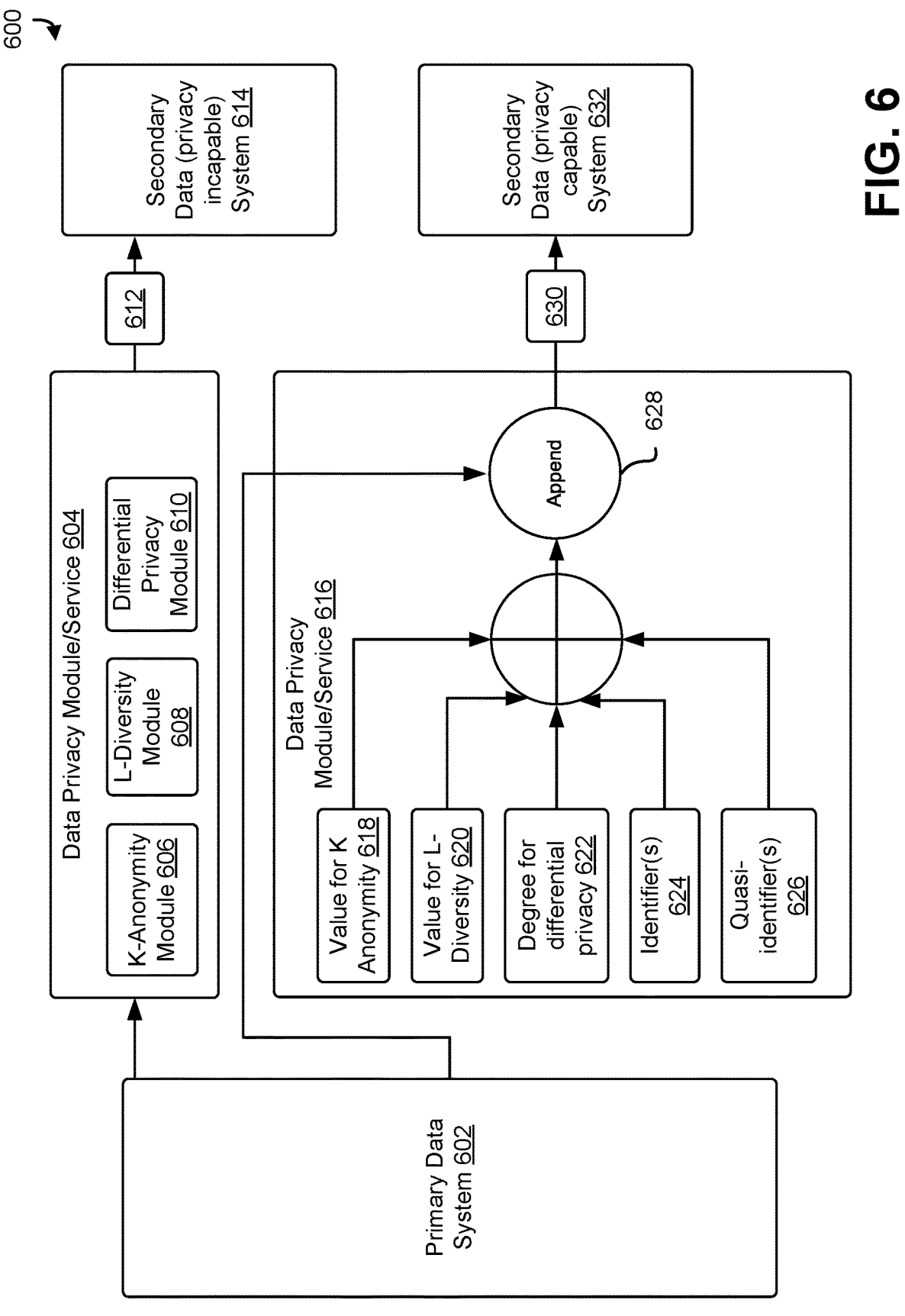
FIG. 6 illustrates another example of a data privacy module or service, according to at least one embodiment.

FIG. 6 illustrates another example 600 of data privacy module or services 604, 616 and interacting with a primacy data system or service 602 and secondary data system or services 614, 632. In some examples, primary data service 602 may be an example of or include one or more aspects of primary data system or service 102, 214, 502 described above in reference to FIGS. 1, 2, and 5. Similarly, secondary data system or services 614, 632 may be an example of or include one or more aspects of secondary data system or services 106, 222, and 520 described above in reference to FIGS. 1, 2, and 5.

In the example of diagram 600, different implementations of the data privacy module/service, such as 604 and 616 may be used depending on whether the secondary data system is trusted or untrusted. Data privacy service 604 may be an example of data privacy service 104 described above, such as may perform process 300 and/or 400 to ensure data compliance for dataset 612 vended to an untrusted or incapable secondary data system 614. Data privacy service 616 may be an example of data privacy service 504 described above, such as may perform a modification of process 300 and/or 400 to ensure data compliance for dataset 630 vended to an trusted secondary data system 632. As will be described in greater detail below in reference to FIG. 7, one or more of the primary data system 602 and/or data privacy module/service 604/616 may perform a process to first determine what type of data system the data is being vended or transferred to and then based on that determination, enforce data privacy compliance in a specific way.

Figure 7:
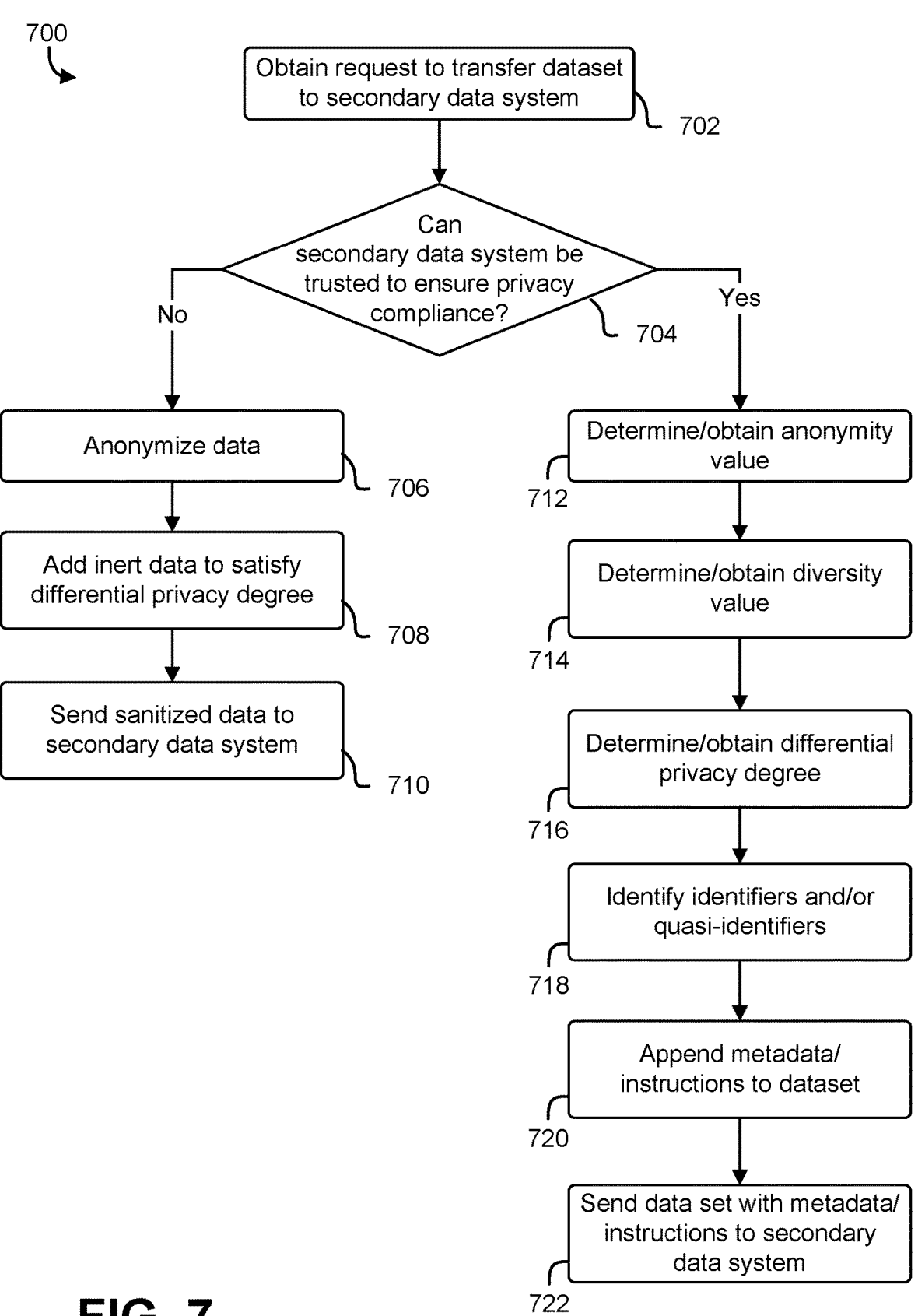
FIG. 7 illustrates an example process for generating privacy compliant datasets, which may be performed by the data privacy module or service of FIG. 6, according to at least one embodiment.

FIG. 7 illustrates an example process 700 for generating privacy compliant datasets, which may be performed by the data privacy module or service 604, 616 described above in reference to FIG. 6. In other examples, one or more aspects of process 700 may be performed by one or more of data privacy service or module 104, 210, or 504 described above in reference to FIGS. 1, 2, and 5. As illustrated in FIG. 7, process 700 may begin at operation 702, in which a request to transfer a dataset to a secondary data system may be obtained or received. In some cases, operation 702 may include determining, based on one or more rules, automated schedules, a change to a dataset being detected, and/or based on other defined triggering events, to transfer a dataset from a primary data system to a secondary data system. Next, at operation 704, it may be determined if the secondary system can be trusted (and is capable of) enforcing data privacy compliance. If the secondary data service cannot be trusted, then process 700 may proceed to operations 706, 708, and 710 where the data may be anonymized, noise may be added to the data to meet a differential privacy threshold, and the privacy compliant or sanitized data may be vended to the secondary data system, respectively. Operations 706-710 may incorporate one or more aspects of processes 300 and/or 400 described above.

However, if the secondary data system can be trusted and is determined to be capable of ensuring or enforcing privacy compliance, at operation 704, then process 700 may proceed to operation 712, where an anonymity value K may be determined (or otherwise obtained, such as from a selectable configuration from the owner or manager of the data). Next, a diversity value L may be obtained or determined, such as similarly from a selectable configuration from the owner or manager of the data, at operation 714. Next, at operation 716, a degree of differential privacy may be obtained or determined, such as similarly from a selectable configuration from the owner or manager of the data. Next identifiers and quasi-identifiers, if present, may be identified in the dataset, at operation 718. The metadata, including the data generated or obtained in operations 712-718, may then be appended to or otherwise associated with the dataset, such as in another field of column of the dataset, at operation 720. The appended dataset may then be transferred to the secondary data system, to enable the secondary data system to enforce privacy compliance on the dataset, at operation 722.

Figure 8:
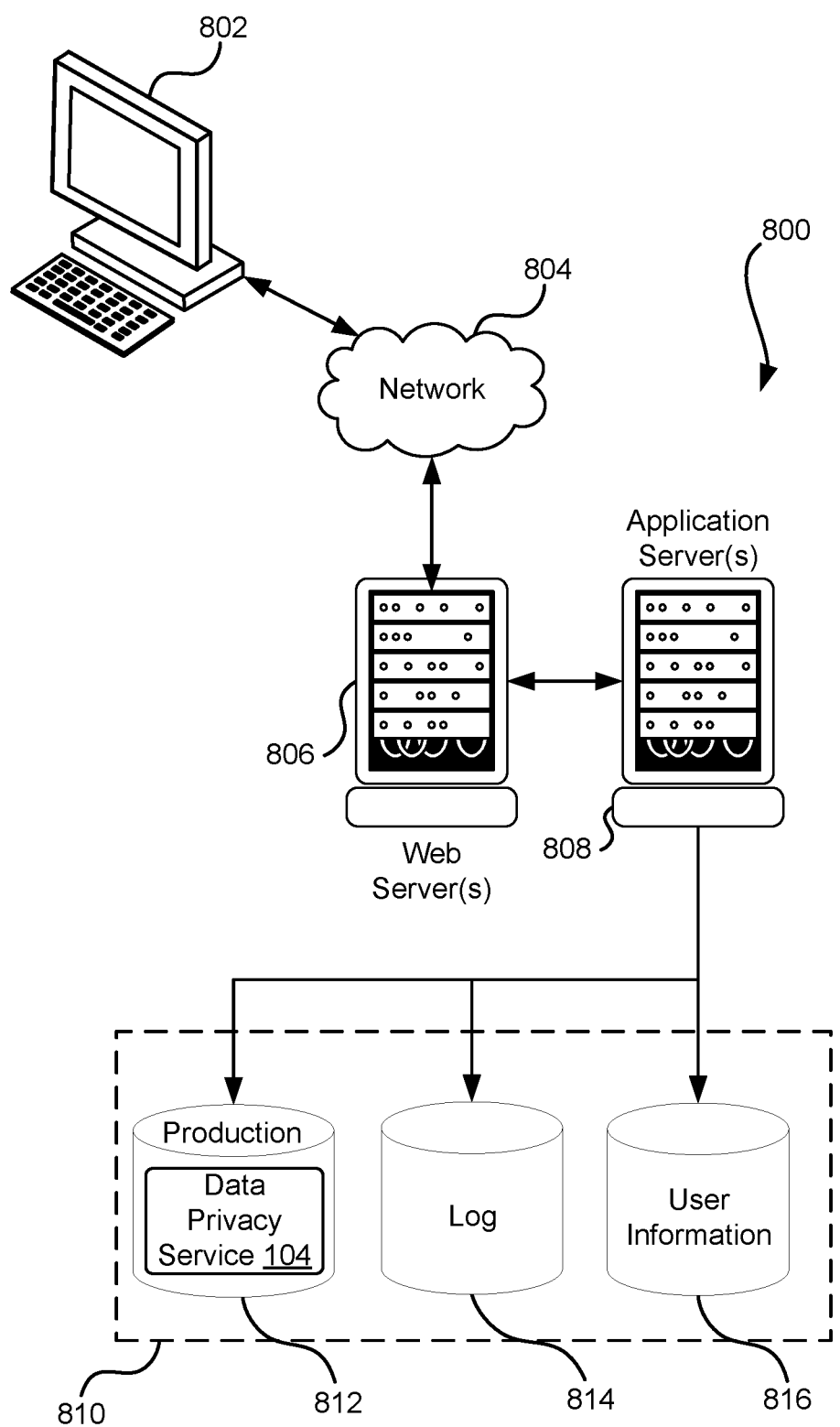
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810. In various cases, the product data 812 may include data for instantiating a data privacy service, such as data privacy service 104 described above.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors;
memory that stores computer-executable instructions that, if executed, cause the one or more processors to:
obtain a request to transfer a dataset from a primary data system to a secondary data system;
based on obtaining the request, enforce a set of privacy policies on the dataset to generate a modified dataset at least by:
suppressing or generalizing values of one or more quasi-identifiers identified in the dataset such that the dataset satisfies one or more of an anonymity test or a diversity test, wherein the values of the one or more quasi-identifiers do not, individually, uniquely identify a user or entity; and
introducing an amount of inert data into the dataset to meet a differential privacy criteria, the differential privacy criteria comprising a percentage of the dataset that includes the inert data, wherein the amount of inert data is generated based at least in part on the one or more quasi-identifiers in the dataset; and
cause the modified data set to be accessible by the secondary data system.

2. The system of claim 1, wherein the computer-executable instructions that, if executed, further cause the one or more processors to:
anonymize data determined to be sensitive in the dataset; and
remove identifiers from the dataset that uniquely identify an individual or entity, to produce the modified dataset.

3. The system of claim 1, wherein the computer-executable instructions that, if executed, further cause the one or more processors to:
iteratively suppress or generalize values of a first quasi-identifier of the one or more quasi-identifiers in the dataset, to produce a first modified dataset, until the first modified dataset satisfies the anonymity test and the diversity test.

4. The system of claim 1, wherein the computer-executable instructions that, if executed, further cause the one or more processors to:

generate the inert data by inserting one or more new values for at least one of the one or more quasi-identifiers into additional entries for the dataset.

5. The system of claim 1, wherein the computer-executable instructions that, if executed, further cause the one or more processors to:

upon determining that the secondary data system is trustworthy to enforce the privacy constraints:

communicate criteria for the anonymity test, criteria for the diversity test, and the differential privacy criteria to the secondary data system; and communicate instructions to the secondary data system to enable the secondary data system to enforce the set of privacy policies on the dataset to generate the modified dataset.

6. A computerized-method comprising:

obtaining a request to transfer a dataset from a primary data system to a secondary data system;

based on obtaining the request, enforcing a set of privacy policies on the dataset to generate a modified dataset by performing one or more of:

modifying values of one or more quasi-identifiers identified in the dataset such that the dataset satisfies one or more of an anonymity test or a diversity test, wherein the values of the one or more quasi-identifiers do not, individually, uniquely identify a user or entity; or introducing an amount of inert data into the dataset to meet a differential privacy criteria, the differential privacy criteria comprising a percentage of the dataset that includes the inert data, wherein the amount of inert data is generated based at least in part on the one or more quasi-identifiers in the dataset; and cause the modified dataset to be accessible by the secondary data system.

7. The computer-implemented method of claim 6, wherein enforcing the set of privacy policies on the dataset to generate the modified dataset further comprises:

anonymizing data determined to be sensitive in the dataset; and removing identifiers from the dataset that uniquely identify an individual or entity to produce the modified dataset.

8. The computer-implemented method of claim 6, wherein modifying values of the one or more quasi-identifiers further comprises:

iteratively suppressing or generalizing values of one or more first quasi-identifiers of the one or more quasi-identifiers in the dataset, to produce a first modified dataset, until the first modified dataset satisfies one or more of the anonymity test or the diversity test.

9. The computer-implemented method of claim 8, wherein the one or more first quasi-identifiers comprises a first quasi-identifier and a second quasi-identifier, the method further comprising:

assigning suppression to the first quasi-identifier of the one or more quasi-identifiers of the dataset;

assigning generalization to the second quasi-identifier of the one or more quasi-identifiers of the dataset, wherein iteratively suppressing or generalizing the values of the one or more first quasi-identifiers of the one or more quasi-identifiers in the dataset, to produce the first modified dataset further comprises:

suppressing values of the first quasi-identifier to produce a first modified dataset;

determining that the first modified data set does not satisfy one or more of the anonymity test or the diversity test;

based on the determining, generalizing values of the second quasi-identifier to produce a second modified dataset; and upon determining that the second modified dataset satisfies one or more of the anonymity test or the diversity test, produce the second modified dataset as the modified dataset to be made accessible by the secondary data system.

10. The computer-implemented method of claim 6, further comprising:

suppressing or generalizing values of a first quasi-identifier of the one or more quasi-identifiers in the dataset, to produce a first modified dataset;

determining that the first modified data set does not satisfy one or more of the anonymity test or the diversity test;

based on the determining, suppressing or generalizing additional values of the first quasi-identifier of the one or more quasi-identifiers in the dataset, to produce a second modified dataset; and upon determining that the second modified dataset satisfies one or more of the anonymity test or the diversity test, produce the second modified dataset as the modified dataset to be made accessible by the secondary data system.

11. The computer-implemented method of claim 6, wherein modifying values of the one or more quasi-identifiers further comprises:

suppressing or generalizing values of a first quasi-identifier of the one or more quasi-identifiers in the dataset, to produce a first modified dataset;

determining that the first modified data set does not satisfy one or more of the anonymity test or the diversity test;

based on the determining, suppressing or generalizing values of the second quasi-identifier of the one or more quasi-identifiers in the dataset, to produce a second modified dataset; and upon determining that the second modified dataset satisfies one or more of the anonymity test or the diversity test, produce the second modified dataset as the modified dataset to be made accessible by the secondary data system.

12. The computer-implemented method of claim 6, further comprising:

generating the inert data by inserting one or more new values for at least one of the one or more quasi-identifiers into additional entries for the dataset.

13. The computer-implemented method of claim 6, further comprising:

upon determining that the secondary data system is trustworthy to enforce the privacy constraints:

communicate instructions to the secondary data system to enable the secondary data system to enforce the set of privacy policies on the dataset to generate the modified dataset.

14. The computer-implemented method of claim 6, wherein enforcing the set of privacy policies on the dataset to generate the modified dataset is performed by a service that is distinct from the primary data service and the secondary data service.

15. The computer-implemented method of claim 6, further comprising:

upon determining that the secondary data system is not trustworthy to enforce the privacy constraints:

causing the primary data system or a data privacy service to enforce the set of privacy policies on the dataset to generate the modified dataset.

16. The computer-implemented method of claim 6, further comprising:

obtaining an indication, or determining, that the dataset comprises sensitive data.

17. One or more non-transitory computer-readable storage media storing thereon executable instructions that, as a result of being executed by one or more processors of a computer system, cause the computer system to at least:

obtain a request to transfer a dataset from a primary data system to a secondary data system;

based on obtaining the request, enforce a set of privacy policies on the dataset to generate a modified dataset by performing at least three of:

anonymizing data determined to be sensitive in the dataset;

removing identifiers from the dataset that uniquely identify an individual or entity to produce the modified dataset;

modifying quasi-identifiers identified in the dataset such that the dataset satisfies at least one of an anonymity test or a diversity test, wherein the quasi-identifiers do not, individually, uniquely identify a user or entity from the dataset; or introducing an amount of inert data into the dataset to meet a differential privacy criteria, the differential privacy criteria comprising a percentage of the dataset includes the inert data; and cause the modified data set to be obtained by the secondary data system.

18. The one or more non-transitory computer-readable storage media of claim 17, wherein the instructions further include instructions that cause the computer system to:

suppress or generalize values of one or more first quasi-identifiers of the one or more quasi-identifiers in the dataset, to produce a first modified dataset, until the first modified dataset satisfies one or more of the anonymity test or the diversity test.

19. The one or more non-transitory computer-readable storage media of claim 17, wherein the instructions further include instructions that cause the computer system to:

generate the inert data by adding new entries into the dataset based on one or more new values for at least one of the one or more quasi-identifiers.

20. The one or more non-transitory computer-readable storage media of claim 17, wherein the instructions further include instructions that cause the computer system to:

perform one or more of: suppress or generalize the quasi-identifiers identified in the dataset such that the dataset satisfies at least one of the anonymity test or the diversity test, or introduce the amount of inert data into the dataset to meet the differential privacy criteria, upon:

anonymizing data determined to be sensitive in the dataset, removing identifiers from the dataset that uniquely identify an individual or entity to produce the modified dataset, and determining that the modified dataset does not satisfy one or more of the anonymity test or the diversity test.

* * * * *